United States Patent
Wang

(10) Patent No.: US 11,063,738 B1
(45) Date of Patent: Jul. 13, 2021

(54) TIME SYNCHRONIZATION USING A WEIGHTED REGRESSION ANALYSIS

(71) Applicant: Equinix, Inc., Redwood City, CA (US)

(72) Inventor: Lanfa Wang, Sunnyvale, CA (US)

(73) Assignee: EQUINIX, INC., Redwood City, CA (US)

( * ) Notice: Subject to any disclaimer, the term of this patent is extended or adjusted under 35 U.S.C. 154(b) by 0 days.

(21) Appl. No.: 17/131,361

(22) Filed: Dec. 22, 2020

Related U.S. Application Data

(60) Provisional application No. 63/016,070, filed on Apr. 27, 2020.

(51) Int. Cl.
*H04L 7/00* (2006.01)
*H04L 25/14* (2006.01)

(52) U.S. Cl.
CPC .......... *H04L 7/0008* (2013.01); *H04L 7/0037* (2013.01); *H04L 25/14* (2013.01)

(58) Field of Classification Search
CPC ....... H04L 7/00; H04L 7/0008; H04L 7/0012; H04L 7/0033; H04L 7/0037; H04L 1/1678; H04L 25/14; H04J 3/0635–0638; H04J 3/0658–0667; H04J 3/0676–0682
See application file for complete search history.

(56) References Cited

U.S. PATENT DOCUMENTS

| | | | |
|---|---|---|---|
| 7,130,368 B1 * | 10/2006 | Aweya | H03L 7/085 375/376 |
| 7,860,205 B1 * | 12/2010 | Aweya | H04J 3/0664 375/376 |
| 9,236,967 B1 * | 1/2016 | Mustiere | H04J 3/0667 |
| 9,294,999 B2 * | 3/2016 | Mueller-Weinfurtner | H04W 52/0238 |
| 9,444,566 B1 * | 9/2016 | Mustiere | H04L 43/087 |
| 9,665,121 B2 * | 5/2017 | Aweya | H04L 69/28 |
| 9,712,435 B2 | 7/2017 | Teng et al. | |
| 9,749,972 B2 * | 8/2017 | Bin Sediq | H04W 56/001 |
| 9,787,461 B1 * | 10/2017 | Zigelboim | H04L 43/0864 |
| 9,801,019 B2 * | 10/2017 | Nallampatti Ekambaram | G01S 7/40 |
| 9,843,405 B2 * | 12/2017 | Aweya | H04B 10/071 |
| 9,886,267 B2 | 2/2018 | Maheshwari et al. | |
| 9,887,876 B2 | 2/2018 | Kumar et al. | |

(Continued)

OTHER PUBLICATIONS

U.S. Appl. No. 16/438,310 filed Jun. 11, 2019 by Ozarkar et al.

(Continued)

*Primary Examiner* — James M Perez
(74) *Attorney, Agent, or Firm* — Shumaker & Sieffert, P.A.

(57) ABSTRACT

Techniques are disclosed for performing time synchronization at a plurality of computing devices in a network. In one example, a method comprising obtaining time stamp data in accordance with a synchronization operation for a timing protocol; computing a skewness estimate and an offset estimate from the time stamp data by executing, over a number of iterations, a weighted regression analysis targeting at least one bound of the time stamp data, the skewness estimate comprising a frequency difference between a first clock at a first computing device and a second clock at a second computing device, the offset estimate comprising a clock time difference between the first clock and the second clock; and applying a clock time correction to the at least one of the first clock or the second clock based the offset estimate.

20 Claims, 8 Drawing Sheets

(56) References Cited

U.S. PATENT DOCUMENTS

| | | | |
|---|---|---|---|
| 9,948,552 B2 | 4/2018 | Teng et al. | |
| 10,015,268 B2 | 7/2018 | Rao | |
| 10,116,499 B2 | 10/2018 | Kumar et al. | |
| 10,285,010 B2* | 5/2019 | Nallampatti Ekambaram | H04W 4/40 |
| 10,764,126 B2 | 9/2020 | Kumar et al. | |
| 10,893,022 B1* | 1/2021 | Li | H04L 63/0209 |
| 10,911,211 B1* | 2/2021 | Kratz | H04B 17/309 |
| 2003/0176196 A1* | 9/2003 | Hall | G01S 5/0205 |
| | | | 455/456.1 |
| 2006/0167784 A1* | 7/2006 | Hoffberg | G06Q 50/188 |
| | | | 705/37 |
| 2007/0087756 A1* | 4/2007 | Hoffberg | G06Q 20/40 |
| | | | 455/450 |
| 2007/0094528 A1* | 4/2007 | Fredriksson | H04L 12/40026 |
| | | | 713/375 |
| 2009/0052431 A1* | 2/2009 | Kroener | H04J 3/0664 |
| | | | 370/350 |
| 2010/0158181 A1* | 6/2010 | Hadzic | H03L 7/087 |
| | | | 375/371 |
| 2010/0158183 A1* | 6/2010 | Hadzic | H03L 7/087 |
| | | | 375/376 |
| 2010/0177763 A1* | 7/2010 | Van Der Stok | H04J 3/0638 |
| | | | 370/350 |
| 2012/0084062 A1* | 4/2012 | Maturana | G06F 30/33 |
| | | | 703/6 |
| 2012/0207183 A1* | 8/2012 | Bobrek | H04J 3/0664 |
| | | | 370/511 |
| 2014/0064303 A1* | 3/2014 | Aweya | H04J 3/0667 |
| | | | 370/509 |
| 2014/0068315 A1* | 3/2014 | Aweya | G06F 1/14 |
| | | | 713/503 |
| 2014/0140255 A1* | 5/2014 | Mueller-Weinfurtner | H04W 52/0238 |
| | | | 370/311 |
| 2014/0376533 A1* | 12/2014 | Tohzaka | H04J 3/0664 |
| | | | 370/338 |
| 2015/0016476 A1* | 1/2015 | Herzog | H04J 3/0635 |
| | | | 370/503 |
| 2015/0163000 A1* | 6/2015 | Aweya | H04L 7/033 |
| | | | 370/519 |
| 2016/0095075 A1* | 3/2016 | Bin Sediq | H04W 56/001 |
| | | | 370/350 |
| 2016/0127117 A1* | 5/2016 | Li | H04J 3/0667 |
| | | | 375/362 |
| 2016/0170437 A1* | 6/2016 | Aweya | H04J 3/0667 |
| | | | 713/503 |
| 2016/0170439 A1* | 6/2016 | Aweya | G06F 1/10 |
| | | | 713/401 |
| 2016/0277196 A1* | 9/2016 | Jose | G01S 13/825 |
| 2016/0277197 A1* | 9/2016 | Jose | H04L 12/18 |
| 2016/0277888 A1* | 9/2016 | Niesen | H04L 43/0852 |
| 2016/0277890 A1* | 9/2016 | Nallampatti Ekambaram | G01S 7/40 |
| 2017/0359210 A1* | 12/2017 | Chaloupka | H04L 69/28 |
| 2018/0007511 A1* | 1/2018 | Nallampatti Ekambaram | G01S 7/40 |
| 2018/0145780 A1* | 5/2018 | Zhao | H04J 3/0661 |
| 2018/0227080 A1* | 8/2018 | Stein | H04J 3/0673 |
| 2018/0262792 A1* | 9/2018 | Mackay | H04N 21/43615 |
| 2019/0141478 A1* | 5/2019 | Nallampatti Ekambaram | G01S 13/74 |
| 2020/0396121 A1 | 12/2020 | Kumar et al. | |
| 2020/0409323 A1* | 12/2020 | Spalt | G06Q 50/06 |
| 2021/0058180 A1* | 2/2021 | Agrawal | H04W 56/0065 |

OTHER PUBLICATIONS

U.S. Appl. No. 17/127,565 filed Dec. 18, 2020 by Wang et al.

Mills et al., "Network Time Protocol Version 4: Protocol and Algorithms Specification," Internet Engineering Task Force (IETF) RFC 5905, Jun. 2010, 110 pp.

Shankarkumar et al., "Precision Time Protocol Version 2 (PTPv2) Management Information Base," Internet Engineering Task Force (IETF) RFC 8173, Jun. 2017, 64 pp.

Aoki et al., "Measurement Scheme for One-Way Delay Variation with Detection and Removal of Clock Skew," ETRI Journal, vol. 32, No. 6, Dec. 2010, 9 pp.

Mang et al., "Clock Synchronization Algorithms for Network Measurements," IEEE Infocom, Jun. 2002, 10 pp.

* cited by examiner

TIME SYNCHRONIZATION USING A WEIGHTED REGRESSION ANALYSIS

This application claims priority to U.S. provisional application No. 63/016,070 filed Apr. 27, 2020, the entire content of which is hereby incorporated by reference.

TECHNICAL FIELD

This disclosure generally relates to time synchronization for computing systems.

BACKGROUND

A synchronization system, in general, synchronizes clocks of multiple devices based on the clock of a chosen master device (also referred to as a "primary" device or a "leader" device). The master device is a computing device that gets time synchronization data from other master devices or intelligent engines deployed either inside or outside of the synchronization system, such as a global positioning system (GPS). The master device maintains accurate clock information for other computing devices, which may be known as "slave" devices.

Time synchronization is the process of coordinating otherwise independent clocks, such as the clocks of computing devices connected to each other on a network. Even when initially set accurately, real clocks will exhibit clock drift and differ after some amount of time due to the fact that even the most accurate clocks count time at slightly different rates. Time synchronization may be part of a timing protocol, such as IEEE 1588 Precision Time Protocol (PTP) and Network Time Protocol (NTP), in operation on the network for correcting differences between the clock of the chosen master device and the clock of a slave device. In network computing and distributed computing environments, each computing device must realize the same global time. Computing devices that are not accurately synchronized may treat the same event as happening in the past, concurrently, or in the future, thereby exhibit unpredictable and unreliable behavior. This is increasingly important in high-speed networking because there may be numerous inter-connected systems that depend on extremely precise timing to function correctly.

In many applications, including but not limited to financial, scientific, military, programmatic advertising, and gaming industries, time synchronization may be beneficial. For instance, such knowledge would be used to define trade orders in high-frequency trading systems and gamers response in multi-user games.

SUMMARY

In general, this disclosure describes techniques for performing time synchronization for a plurality of computing devices that are interconnected to each other in a network. Technology implementing at least some of these techniques includes at least one hardware/software component, such as processing circuitry executing programmable logic (e.g., in form of processor-executable instructions or code). A timing protocol, operative on the plurality of computing devices in the network, may leverage this technology to enable efficient data communications between these computing devices. In one example, the timing protocol enables such efficient data communications by applying accurate clock time corrections at one or more of the computing devices in the network. As described herein, an accurate clock time correction may synchronize at least two clocks (e.g., to a correct reference time), mitigating effects from network delays and clock drift.

Certain time synchronization techniques make a number of assumptions that may render any clock time correction faulty and inaccurate, especially in response to a non-trivial network induced delay (e.g., queuing delay). These techniques may rely upon a traditional regression analysis of a given dataset, which assumes that an error parameter in a regression model forms a normal distribution with zero mean; however, the traditional regression analysis fails (or is otherwise considered inaccurate) when the error parameter of the regression model has non-negative and/or non-positive values forming a target line or lines along peaks and/or troughs, respectively, of the given dataset. Hence, the target line may be defined along an upper bound or a lower bound of the given dataset. The target line referred to in this disclosure does not automatically define a linear distribution and the techniques described herein do not foreclose on having a non-linear distribution as "the target line" in any regression analysis. In some examples, the target line may have multiple upper/lower bounds that share or partially share parameters of the regression model.

In addition to resolving a failure (or inaccuracy) in the traditional regression analysis, the techniques described herein provide a weighted regression analysis to be executed over a number of iterations until a resulting regression model accurately predicts a desired variable (e.g., an offset estimate for a measured delay in accordance with the timing protocol). In some examples, the resulting regression model includes a machine learning model having at least one hyperparameter and parameters for predicting the target distribution (e.g., target linear bound or line). The parameters for the weighted regression analysis include a set of weights to be applied to data points (e.g., measured delays) in the given dataset (e.g., time stamp data), fitting the data points to the target distribution. In each iteration, the techniques described herein update the set of weights to better predict the target distribution. In some examples, the techniques described here update the target distribution or identify a more approximate target distribution for the machine learning model in the weighted regression analysis.

The techniques of the disclosure provide one or more specific technical improvements in computer networks. As described herein, timing protocols for such computer networks require accuracy when measuring delays between computing devices, especially a server having a master clock and another server operating as a slave, in order to perform precise time synchronization. Clock synchronization, in general, refers to correcting a clock offset at one or more computing devices in a network. Having an accurate clock offset enables efficient and less faulty data communications between the computing devices of the network. For example, by directing the weighted regression analysis to target an upper bound and/or a lower bound of the measured delays in data communications between computing devices in the network, the techniques of the disclosure allow for accounting of synchronization between clocks of a plurality of computing devices on a network. Furthermore, the techniques of the disclosure may allow for the efficient calculation of the trip time, even during time periods of heavy network traffic or for an arbitrarily large network that has an arbitrarily large number of bidirectional paths between computing devices. By doing so, these techniques help a computing device conserve its resource capacities including processing power and memory space by reducing processor and memory usage. Some techniques of the disclosure may be applicable when the minimum path cannot be defined. Such techniques may allow for much more accurate time synchronization between the clocks of computing devices as compared to other methods.

As described herein, methods, systems, and devices are disclosed for performing time synchronization for a plurality of computing devices on a network having paths between the plurality of computing devices. In one example, a computing device obtains time-stamp data the indicates trip time for packets between a first computing device and a second computing device, computes a skewness estimate and an offset estimate from the time stamp data by executing, over a number of iterations, a weighted regression analysis, the skewness estimate comprising a frequency difference between a first clock at the first computing device and a second clock at the second computing device, the weighted regression analysis comprising a set of weights as parameters for training a regression model to predict the offset estimate and the skewness estimate, and corrects the first clock at the computing device in accordance with the synchronization operation for the timing protocol. As an example, the techniques may include applying, based on the value for the offset estimate, a time correction that adds/subtracts an amount of time to/from the first clock at the computing device. During the time correction, the actual amount of time being added to or subtracted from a current time of the first clock may or may not be equal to the offset estimate.

In one example, this disclosure describes a method for time synchronization for a plurality of clocks on a network, comprising: obtaining, by processing circuitry of a first computing device in a network having a network topology of computing devices, time stamp data in accordance with a synchronization operation for a timing protocol, wherein the time stamp data describes one or more measured delays for a path between the first computing device and a second computing device of the network; computing, by the processing circuitry, a skewness estimate and an offset estimate from the time stamp data by executing, over a number of iterations, a weighted regression analysis targeting at least one bound of the time stamp data, the skewness estimate comprising a frequency difference between a first clock at the first computing device and a second clock at the second computing device, the offset estimate comprising a clock time difference between the first clock and the second clock, the weighted regression analysis comprising a set of weights for training a regression model to predict the offset estimate and the skewness estimate, the regression model having parameters to apply to the at least one bound of the time stamp data, wherein the parameters of the regression model and the set of weights are updated after each iteration of the number of iterations; and applying a clock time correction to the at least one of the first clock or the second clock based the offset estimate.

In one example, this disclosure describes a network device for time synchronization for a plurality of clocks on a network having a network topology of computing devices. The network device comprises computer memory and processing circuitry to obtain time stamp data in accordance with a synchronization operation for a timing protocol, wherein the time stamp data describes one or more measured delays for a path between the first computing device and a second computing device of the network; compute a skewness estimate and an offset estimate from the time stamp data by executing, over a number of iterations, a weighted regression analysis targeting at least one bound of the time stamp data, the skewness estimate comprising a frequency difference between a first clock at the first computing device and a second clock at the second computing device, the offset estimate comprising a clock time difference between the first clock and the second clock, the weighted regression analysis comprising a set of weights for training a regression model to predict the offset estimate and the skewness estimate, the regression model having parameters to apply to the at least one bound of the time stamp data, wherein the parameters of the regression model and the set of weights are updated after each iteration of the number of iterations; and apply a clock time correction to the at least one of the first clock or the second clock based the offset estimate.

In another example, this disclosure describes a non-transitory computer-readable medium comprising instructions that when executed, cause a network device to obtaining, by processing circuitry of a first computing device in a network having a network topology of computing devices, time stamp data in accordance with a synchronization operation for a timing protocol, wherein the time stamp data describes one or more measured delays for a path between the first computing device and a second computing device of the network; computing, by the processing circuitry, a skewness estimate and an offset estimate from the time stamp data by executing, over a number of iterations, a weighted regression analysis targeting at least one bound of the time stamp data, the skewness estimate comprising a frequency difference between a first clock at the first computing device and a second clock at the second computing device, the offset estimate comprising a clock time difference between the first clock and the second clock, the weighted regression analysis comprising a set of weights for training a regression model to predict the offset estimate and the skewness estimate, the regression model having parameters to apply to the at least one bound of the time stamp data, wherein the parameters of the regression model and the set of weights are updated after each iteration of the number of iterations; and applying a clock time correction to the at least one of the first clock or the second clock based the offset estimate.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Real-world bidirectional paths between computing devices exhibit network delay effects, which, if not accounted for during clock synchronization for a timing protocol, may impair the computing devices' functionality. Various aspects of the present disclosure implement techniques that enable precise clock synchronization in real-time. Some techniques are configured to eliminate/mitigate timing errors from network delays in clock systems. The heavier the network load, the more likely the delay effect causes poor performance of the clock synchronization process.

Timing protocols rely upon time stamp data corresponding to packet communications between computing devices in the network. For most timing protocols, an accurate clock offset is determined at a minimum path delay in these communications. For linear regression, a linear relationship holds true at the minimum path which is a lower bound of time stamp data. Modeling the minimum path can be difficult, especially during time periods of network induced delays. Data points deviating from a true minimum path (or errors) in the time stamp data can be modeled in a linear regression as a normal distribution with a mean of zero (0) where W is a vector of coefficients, b is the intercept, and E is the error:

$$\hat{Y} = XW^T + b + \in.$$

Using the above approach to model the minimum path is inaccurate because most error distributions in time stamp data are not normal. In addition, the points at the beginning and end of the bound are generally not along the line, which should not be used. Another potential drawback is that data points on the bound are sensitive to fluctuations in the time stamp data. Furthermore, the number of points on the bound can be only a few, which can cause large uncertainty in the estimation of regression model parameters. The techniques described herein provide substantial accuracy in the regression model of the true minimum path bound, for example, by introducing weights to properly train the regression model to estimate the model parameters. In the use case of clock synchronization, the model parameters may be used to compute a skewness estimate and the offset estimate.

Although described for examples related to time synchronization, there are other use cases for the techniques described herein. Another example use case in which the techniques of the disclosure may be applied is a technical financial analysis where a trend line is along the lower/upper points when the market is trending to the upside/downside over a period of time window. When the market is trending to the upside, resistance levels are formed as the price action slows and starts to pull back toward the trendline. On the other hand, when the market is trending to the downside, traders will watch for a series of declining peaks and will attempt to connect these peaks together with a trend line.

Figure 1:
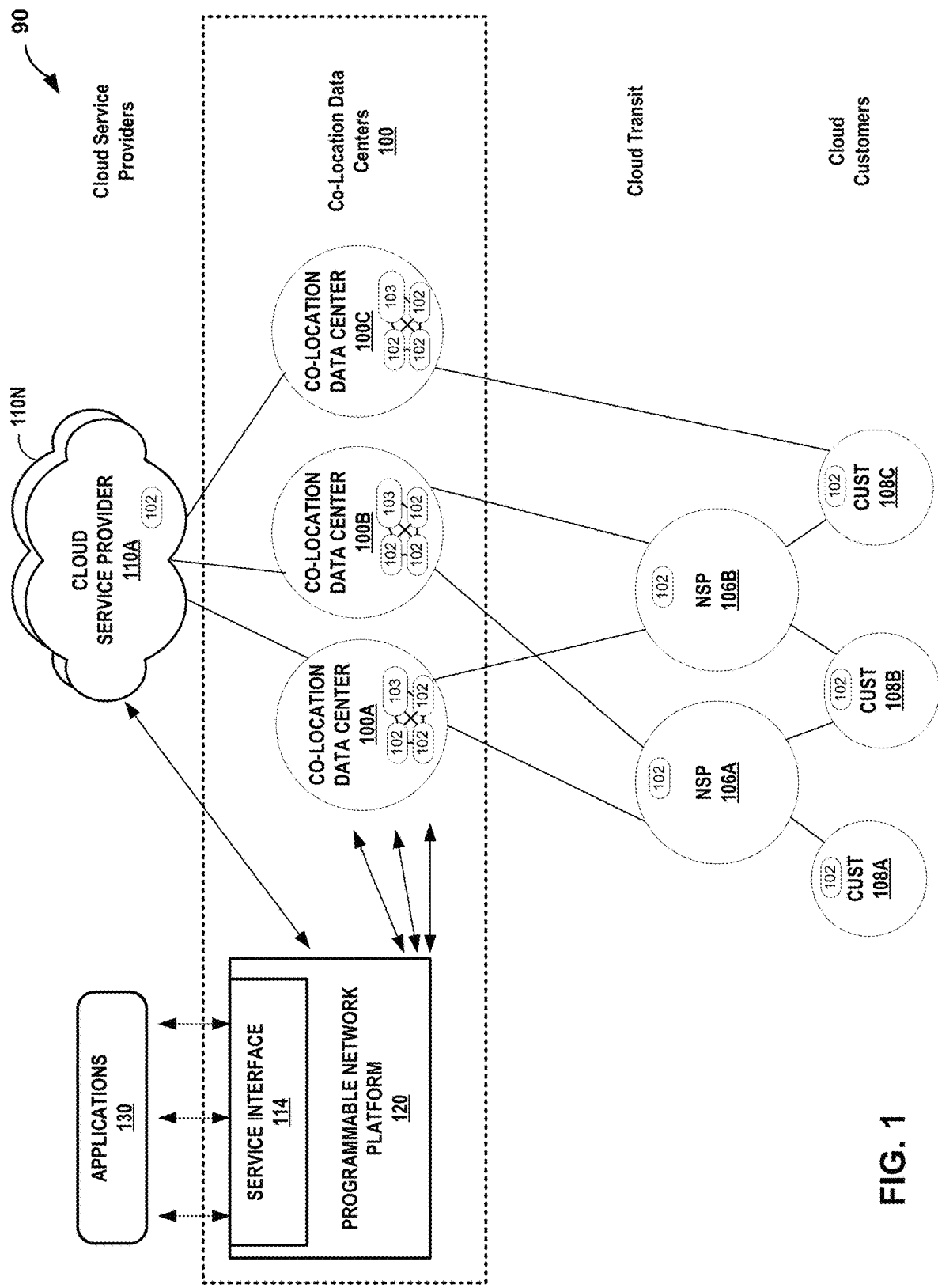
FIG. 1 is a block diagram illustrating an example system that performs time synchronization for a plurality of computing devices in a network exhibiting a delay effect.

FIG. 1 is a block diagram illustrating an example system 90 that performs time synchronization for a plurality of computing devices (e.g., computing devices 102 and customer devices 108A-108C, hereinafter, "customer devices 108") that exhibit queuing delay between the plurality of computing devices. In general, a user such as customer 108A or a provider operator begins a user session with the portal application for engaging a co-location data center 100. As the user session makes service requests to various applications 130 within co-location data center 100, each of the applications 130 perform various sub-transactions to service the requests.

As illustrated by FIG. 1, co-location data centers 100A-100C ("co-location data centers 100") may provide an access point by which cloud-based services customers ("cloud customers") and cloud-based service providers ("cloud service providers") connect to receive and provide, respectively, cloud services. A co-location data center provider may deploy instances of co-location data centers 100 in multiple different metropolitan areas, each instance of co-location data center 100 having one or more co-location data center points (not depicted). A co-location data center may offer interconnection services, such as a cloud exchange, an Ethernet exchange, an Internet exchange, or cross-connections.

Co-location data centers 100 may include a cloud exchange and thus include network infrastructure and an operating environment by which cloud customers 108A-108C (collectively, "cloud customers 108") receive cloud services from multiple cloud service providers 110A-110N (collectively, "cloud service providers 110"). Cloud customers 108 may receive cloud services directly via a layer 3 peering and physical connection to co-location data centers 100 or indirectly via one of network service providers 106A-106B (collectively, "NSPs 106," or alternatively, "carriers 106"). NSPs 106 provide "cloud transit" by maintaining a physical presence within co-location data centers 100 and aggregating layer 3 access from one or customers 108. NSPs 106 may peer, at layer 3, directly with co-location data centers 100, and in so doing, offer indirect layer 3 connectivity and peering to one or more customers 108 by which customers 108 may obtain cloud services from the cloud service providers 110. Co-location data centers 100, in the example of FIG. 1, are assigned an autonomous system number (ASN). Thus, co-location exchange points 129 are next hops in a path vector routing protocol (e.g., BGP) path from cloud service providers 110 to customers 108. As a result, any of co-location data centers 100 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, co-location data centers 100 may internalize the eBGP peering relationships that cloud service providers 110 and customers 108 would maintain on a pairwise basis. Rather, co-location data center 100 allows a customer 108 to configure a single eBGP peering relationship with co-location data centers 100 and receive, via the co-location data center, multiple cloud services from one or more cloud service providers 110. While described herein primarily with respect to eBGP or other layer 3 routing protocol peering between co-location data centers 100 and customer, NSP, or cloud service provider networks, co-location data centers 100 may learn routes from these networks in other way, such as by static configuration, or via Routing Information Protocol (RIP), Open Shortest Path First (OSPF), Intermediate System-to-Intermediate System (IS-IS), or other route distribution protocol.

In some examples, co-location data center 100 allows a corresponding one of customer customers 108A, 108B of any network service providers (NSPs) or "carriers" 106A-106B (collectively, "carriers 106") or other cloud customers including customers 108C to be directly cross-connected, via a virtual layer 2 (L2) or layer 3 (L3) connection to any other customer network and/or to any of CSPs 110, thereby allowing direct exchange of network traffic among the customer networks and CSPs 110.

Carriers 106 may each represent a network service provider that is associated with a transit network by which network subscribers of the carrier 106 may access cloud services offered by CSPs 110 via the co-location data center 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud services as are offered by the CSPs 110 via the co-location data center 100.

In this way, co-location data center 100 streamlines and simplifies the process of partnering CSPs 110 and customers (via carriers 106 or directly) in a transparent and neutral manner. One example application of co-location data center 100 is a co-location and interconnection data center in which CSPs 110 and carriers 106 and/or customers 108 may already have network presence, such as by having one or more accessible ports available for interconnection within the data center, which may represent co-location data centers 100. This allows the participating carriers, customers, and CSPs to have a wide range of interconnectivity options within the same facility. A carrier/customer may in this way have options to create many-to-many interconnections with only a one-time hook up to co-location data centers 100. In other words, instead of having to establish separate connections across transit networks to access different cloud service providers or different cloud services of one or more cloud service providers, co-location data center 100 allows customers to interconnect to multiple CSPs and cloud services.

Co-location data center 100 includes a programmable network platform 120 for dynamically programming a services exchange (e.g., a cloud exchange) of the co-location data center 100 to responsively and assuredly fulfill service requests that encapsulate business requirements for services provided by co-location data center 100 and/or cloud service providers 110 coupled to the co-location data center 100. The programmable network platform 120 as described herein may, as a result, orchestrate a business-level service across heterogeneous cloud service providers 110 according to well-defined service policies, quality of service policies, service level agreements, and costs, and further according to a service topology for the business-level service.

The programmable network platform 120 enables the cloud service provider that administers the co-location data center 100 to dynamically configure and manage the co-location data center 100 to, for instance, facilitate virtual connections for cloud services delivery from multiple cloud service providers 110 to one or more cloud customers 108. The co-location data center 100 may enable cloud customers 108 to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

Programmable network platform 120 may represent an application executing within one or more data centers of the co-location data center 100 or alternatively, off-site at a back office or branch of the cloud provider (for instance). Programmable network platform 120 may be distributed in whole or in part among the co-location data centers 100.

In the illustrated example, programmable network platform 120 includes a service interface (or "service API") 114 that defines the methods, fields, and/or other software primitives by which applications may invoke the programmable network platform 120. The service interface 114 may allow carriers 106, customers 108, cloud service providers 110, and/or the co-location data center provider programmable access to capabilities and assets of the co-location data center 100.

For example, the service interface 114 may facilitate machine-to-machine communication to enable dynamic provisioning of virtual circuits in the co-location data center for interconnecting customer and cloud service provider networks. In this way, the programmable network platform 120 enables the automation of aspects of cloud services provisioning. For example, the service interface 114 may provide an automated and seamless way for customers to establish, de-install and manage interconnection with multiple, different cloud providers participating in the co-location data center.

Further example details of a services exchange, such as a cloud-based services exchange, can be found in U.S. Provisional Patent Application No. 62/149,374, filed Apr. 17, 2015 and entitled "Cloud-Based Services Exchange;" in U.S. Provisional Patent Application No. 62/072,976, filed Oct. 30, 2014 and entitled "INTERCONNECTION PLATFORM FOR REAL-TIME CONFIGURATION AND MANAGEMENT OF A CLOUD-BASED SERVICES EXCHANGE;" and in U.S. patent application Ser. No. 15/001,766 and entitled "MULTI-CLOUD, MULTI-SERVICE DATA MODEL," each of which are incorporated herein by reference in their respective entireties.

Applications 130 represent systems of engagement by which customers or internal operators for the co-locations data centers 100 may request services, request assets, request information regarding existing services or assets, and so forth. Each of applications 130 may represent a web portal, a console, a stand-alone application, an operator portal, a customer portal, or other application by which a user may engage programmable network platform 120.

In this example, each of co-location data centers 100 includes a set of computing devices 102, 103 that communicate via a network. In addition, co-located or other networks that receive interconnection and/or timing services from co-location data centers 100 may also include instances of computing devices 102. Networks associated with customers 108, NSPs 106, and cloud service providers 110 each include one or more instances of computing devices 102. Such networks may be co-located in one or more co-location data centers 100 or may have connections to the co-location data centers via an NSP connection, private connection, or other network connection. Accordingly, computing devices 102 located external to the co-location data centers 100 may receive timing services provided by timing servers of the co-location data centers 100.

Computing devices 102 may include storage systems and application servers that are interconnected via a high-speed switch fabric provided by one or more tiers of physical network switches and routers. For ease of illustration, FIG. 1 depicts three data centers 100A-100C, each of which has only a few computing devices 102. However, the techniques of the disclosure may be applied to large-scale networked systems that include dozens of data centers 100, each data center 100 having thousands of computing devices 102. Computing devices 102 may further include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other computing devices. In some examples, computing devices 102 may include top-of-rack switches, aggregation routers, and/or core routers.

Computing devices in a network may implement a clock synchronization protocol to synchronize a clock of each computing device with other computing devices on the network (e.g., a network within system 90 or the Internet). For example, a network system may implement clock synchronization protocol such as Network Time Protocol (NTP) or Precision Time Protocol (PTP) to perform clock synchronization. Further information with regard to NTP is provided in "Network Time Protocol Version 4: Protocol and Algorithms Specification," RFC5905, Internet Engineering Task Force (IETF) (June 2010), available at https://tools.ietf.org/html/rfc5905, the entire content of which is incorporated by reference. Further information with regard to PTP is provided in "Precision Time Protocol Version 2 (PTPv2) Management Information Base," RFC 8173, Internet Engineering Task Force (IETF) (June 2017), available at https://tools.ietf.org/html/rfc8173, the entire content of which is incorporated by reference.

As an example, time synchronization protocols such as NTP or PTP implement a master computing device that acts as a reference clock to provide reference timing signals to slave computing devices that synchronize their system time to the system time of the master computing device. However, NTP and PTP suffer from some accuracy issues. For example, NTP and PTP assume a well-defined minimum measured delay and a constant queuing delay. However, real-world bidirectional paths between computing devices exhibit dynamic variations in queuing delay, especially during time periods of heavy network traffic in both directions. Furthermore, the minimum measured delay becomes less well-defined during heavy network traffic and NTP and PTP cannot rely upon traditional algorithms for time synchronization, which depend upon the minimum measured delay for clock offset estimation. If used, the minimum measured delay imposes error in clock synchronization between two devices, limiting the precision with which clocks in a network may be synchronized to one another.

Master computing device 103 represents a computing device that is time server (i.e., master node) for a clock synchronization protocol, while one or more computing devices 102 are slave nodes that receive clock synchronization information from master computing device 103 with which to synchronize their local clocks to the master clock of master computing device 103.

In accordance with the techniques of the disclosure, a computing device, such as one of computing devices 102, master computing device 103, programmable network platform 120, or another computing device, facilitates time synchronization for computing devices 102 that experience network queuing delay along paths from the master computing device 103 to computing devices 102.

In some examples, programmable network platform 120 provides a synchronization service that allows precise and accurate synchronization of time with the distributed set of devices connected to high-precision GPS antennas. The synchronization service may support both the NTP and PTP standards. The synchronization service is deployed on highly available infrastructure, and may provide security via integration with a cloud exchange fabric security system. One or more of customers 108, NSPs 106, or CSPs 110 may make use of the synchronization service. One example of a time synchronization service in a cloud exchange system is provided by U.S. application Ser. No. 16/438,310, filed Jun. 11, 2019, the entire contents of which are incorporated by reference herein.

The computing device may implement any of the techniques described herein. In one example, the computing device includes processing circuitry that obtains time stamp data in accordance with a synchronization operation for a timing protocol, computes a skewness estimate and an offset estimate from the time stamp data by executing, over a number of iterations, a weighted regression analysis, and corrects the first clock at the computing device in accordance with the synchronization operation for the timing protocol. The skewness estimate includes a frequency difference between a first clock at the computing device and a second clock at another computing device and the offset estimate includes a clock time difference between the first clock and the second clock. The weighted regression analysis includes a set of weights for training a regression model (e.g., a machine learning model) to predict the offset estimate and the skewness estimate. The regression model includes parameters to apply to each line being targeted as a linear bound. The parameters of the regression model and the set of weights are updated after each iteration of the number of iterations. As one example, the computing device, using the offset estimate and/or the skewness estimate, applies a time correction to correct an offset of the first clock. This may involve adjusting a current time value of the first clock by a certain amount of time units (e.g., nanoseconds).

The techniques of the disclosure provide one or more specific technical improvements in computer networks. Further, the techniques of the disclosure provide specific practical applications to the field of time synchronization for computer networks. For example, the techniques of the disclosure allow for estimating and accounting for queuing delay along bidirectional paths between clocks of a plurality of computing devices on a network. Furthermore, the techniques of the disclosure may allow for the efficient clock time correction, even during time periods of heave network traffic or for an arbitrarily large network that has an arbitrarily large number of bidirectional paths between computing devices. Such techniques may allow for much more accurate time synchronization between the clocks of computing devices as compared to other methods. In addition, while primarily described herein in the context of a data center, the techniques of this disclosure may be applied to other contexts in which a master time server offers synchronization to one or more computing devices via a network.

The techniques of this disclosure do not assume symmetrical signal propagation delay for any bidirectional path between two computing devices, e.g., the time required for a signal sent from a first computing device to reach a second computing device is the same as the time required for a signal sent from the second computing device to reach the first computing device.

Some algorithms in conventional clock synchronization solutions may rely upon a minimum delay. However, there are a number of issues related to such reliance, especially during periods of heavy network traffic. As one example, the minimum delay is not well defined when there is considerable queueing effect. Application of a packet filter may not be effective during such time periods of heavy network traffic; for one reason, the variation in the separation between pairs of packets can be significant and cannot be assumed to be constant.

The distribution of the queuing delay may play an important role in the estimation of clock offset and skewness. When the level of network traffic is heavy, network queuing effects start to play an important role and the distribution of queuing induced delays is dynamic (e.g., non-linear), which has strong dependence on both the traffic load and the configuration of overall network. Moreover, the minimum measured delay is no longer be clearly defined. The techniques described herein differ from such solutions by properly modeling the dynamic variation of the queuing delay and eliminating the uncertainty (i.e., errors) from relying upon the minimum measured delay.

Some approaches utilize additional hardware to handle the dynamic queuing delay variation. PTP, for instance, may employ a Transparent Clock (TC) switch, which measures the residence time (e.g., the time that the packet spends passing through the switch or the router) and adds the residence time into the correction field of the PTP packet. In contrast, the techniques described herein may handle the dynamic delay variation without additional hardware.

Figure 2:
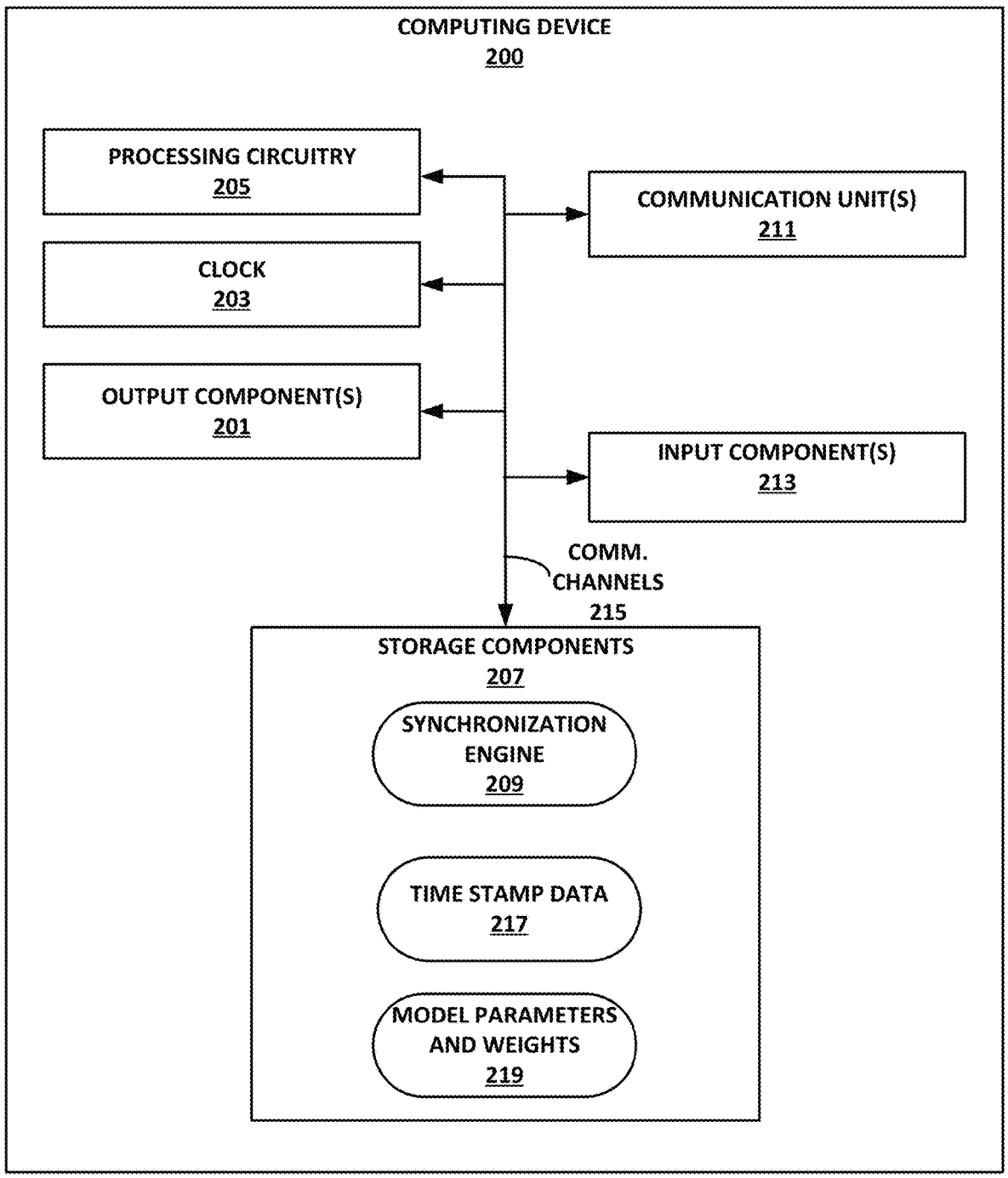
FIG. 2 is a block diagram illustrating an example computing device within the example system of FIG. 1 in accordance with one or more techniques of the disclosure.

FIG. 2 is a block diagram illustrating example computing device 200, in accordance with one or more techniques of the disclosure. Computing device 200 of FIG. 2 is described below as an example of one of computing devices 102 of FIG. 1 but may represent computing device 103, programmable network platform 120, or another computing device that is not in the network path between a master and slave but instead receives time stamp data and computes offset correction and/or frequency correction data as described here. FIG. 2 illustrates only one example of computing device 200, and many other examples of computing device 200 may be used in other instances and may include a subset of the components included in example computing device 200 or may include additional components not shown in example computing device 200 of FIG. 2.

As shown in the example of FIG. 2, computing device 200 includes processing circuitry 205, one or more input components 213, one or more communication units 211, one or more output components 201, and one or more storage components 207. Storage components 207 of computing device 200 include emulation module 4 and modulation module 6. Communication channels 215 may interconnect each of the components 201, 203, 205, 207, 211, and 213 for inter-component communications (physically, communicatively, and/or operatively). In some examples, communication channels 215 may include a system bus, a network connection, an inter-process communication data structure, or any other method for communicating data.

One or more communication units 211 of computing device 200 may communicate with external devices, such another of computing devices 102 of FIG. 1, via one or more wired and/or wireless networks by transmitting and/or receiving network signals on the one or more networks. Examples of communication units 211 include a network interface card (e.g. such as an Ethernet card), an optical transceiver, a radio frequency transceiver, a GPS receiver, or any other type of device that can send and/or receive information. Other examples of communication units 211 may include short wave radios, cellular data radios, wireless network radios, as well as universal serial bus (USB) controllers.

One or more input components 213 of computing device 200 may receive input. Examples of input are tactile, audio, and video input. Input components 213 of computing device 200, in one example, includes a presence-sensitive input device (e.g., a touch sensitive screen, a PSD), mouse, keyboard, voice responsive system, video camera, microphone or any other type of device for detecting input from a human or machine. In some examples, input components 213 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like).

One or more output components 201 of computing device 200 may generate output. Examples of output are tactile, audio, and video output. Output components 201 of computing device 200, in one example, includes a PSD, sound card, video graphics adapter card, speaker, cathode ray tube (CRT) monitor, liquid crystal display (LCD), or any other type of device for generating output to a human or machine.

Processing circuitry 205 may implement functionality and/or execute instructions associated with computing device 200. Examples of processing circuitry 205 include application processors, display controllers, auxiliary processors, one or more sensor hubs, and any other hardware configure to function as a processor, a processing unit, or a processing device. Synchronization engine 209 may be operable by processing circuitry 205 to perform various actions, operations, or functions of computing device 200. For example, processing circuitry 205 of computing device 200 may retrieve and execute instructions stored by storage components 207 that cause processing circuitry 205 to perform the operations of synchronization engine 209. The instructions, when executed by processing circuitry 205, may cause computing device 200 to store information within storage components 207.

One or more storage components 207 within computing device 200 may store information for processing during operation of computing device 200 (e.g., computing device 200 may store data accessed by synchronization engine 209 during execution at computing device 200). Examples of the data accessed by synchronization engine 209 include time stamp data 217 recording actual time stamps corresponding to reception/transmission times for these packets, in addition to the measured delays. Time stamp data 217 further includes data describing measured delays for packets communicated between computing device 200 and other computing devices in a network. Other examples of the data accessed by synchronization engine 209 include model parameters and weights 219 for the regression model in the weighted regression analysis, respectively. In some examples, storage component 48 is a temporary memory, meaning that a primary purpose of storage component 48 is not long-term storage. Storage components 207 on computing device 200 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 207, in some examples, also include one or more computer-readable storage media. Storage components 207 in some examples include one or more non-transitory computer-readable storage mediums. Storage components 207 may be configured to store larger amounts of information than typically stored by volatile memory. Storage components 207 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 207 may store program instructions and/or information (e.g., data) associated with synchronization engine 209. Storage components 207 may include a memory configured to store data or other information associated with synchronization engine 209.

Clock 203 is a device that allows computing device 200 to measure the passage of time (e.g., track system time). Clock 203 typically operates at a set frequency and measures a number of ticks that have transpired since some arbitrary starting date. Clock 203 may be implemented in hardware and/or software. In accordance with the techniques of the disclosure, synchronization engine 209 performs time synchronization for one or more computing devices 102 that experience queuing delay along paths from master computing device 103 to the computing devices 102.

The processing circuitry 205 may implement any of the techniques described herein. In one example, processing circuitry 205 obtains time stamp data in accordance with a synchronization operation for a timing protocol and computes a skewness estimate and an offset estimate from the time stamp data using a weighted regression analysis. In some examples, skewness refers to a frequency difference between a first clock at a first computing device and a second clock at a second computing device; and an estimate of that frequency difference may be a slope of a bound (e.g., a line) of data points in the time stamp data such that, per each time step/interval, the first clock and the second clock drift apart by an amount of time defined by that estimate (if no clock time correction occurs). The offset estimate refers to a clock time difference between the first clock and the second clock, and an estimate of that clock time difference may be, at an initial time step/interval, a portion of an intercept of the same bound and, at a next time step/interval, a summation of the initial clock time difference and the amount of time defined by the skewness estimate. The offset estimate increases by the skewness estimate for each subsequent time step/interval.

The processing circuitry 205 computes an offset estimate and the skewness estimate based upon a machine learning model and a set of weights for training the machine learning model to predict a slope and an intercept for the bound such that the slope can be used for the skewness estimate and the intercept can be used for offset estimate and a trip time. In some examples, the machine learning model refers to at least one mathematical function that accepts, as input, the time stamp data, applies a set of parameters (e.g., a slope and an intercept) to the time stamp data, and produces, as output, the skewness estimate and the offset estimate. The set of weights and an objective function are used to update the set of parameters in the machine learning model. The weighted regression analysis further updates the set of weights to further converge the model parameters during training, improving upon a precision of these model parameters.

In some examples, clock 203 is a reference clock, and clocks of other computing devices 102 are slave clocks synchronized to clock 203. In such examples, synchronization engine 209 applies, based on the values for the offset estimate in each direction of a bidirectional path, a time correction to each of the slave clocks of other computing devices 102 to synchronize the slave clocks of other computing devices 102 with clock 203. In other examples, synchronization engine 209 executes a time correction for clock 203 by adjusting a time value given by clock 203 in accordance with the offset estimate; in one particular example, synchronization engine 209 may increase or decrease that time value by the offset estimate.

Figure 3A:
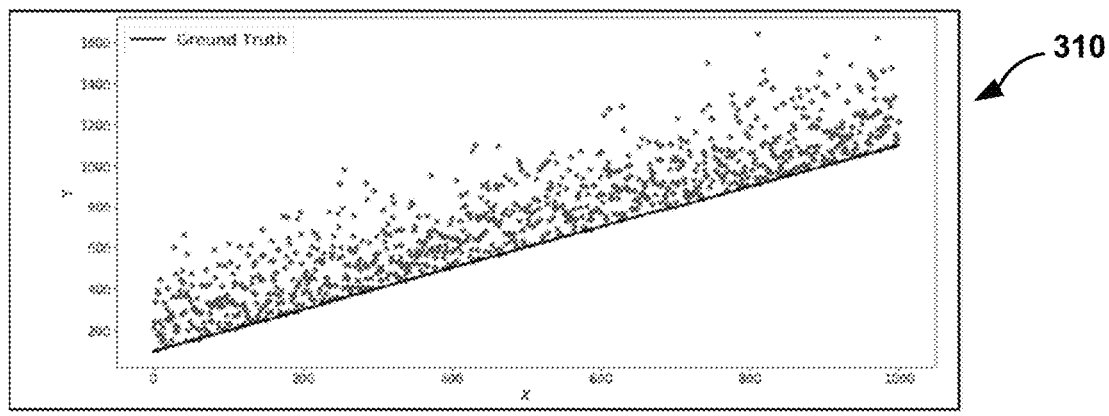
FIGS. 3A-3C illustrate three respective target distributions of measured delays for data communications between computing devices in a network in accordance with one or more techniques of the disclosure.
Figure 3B:
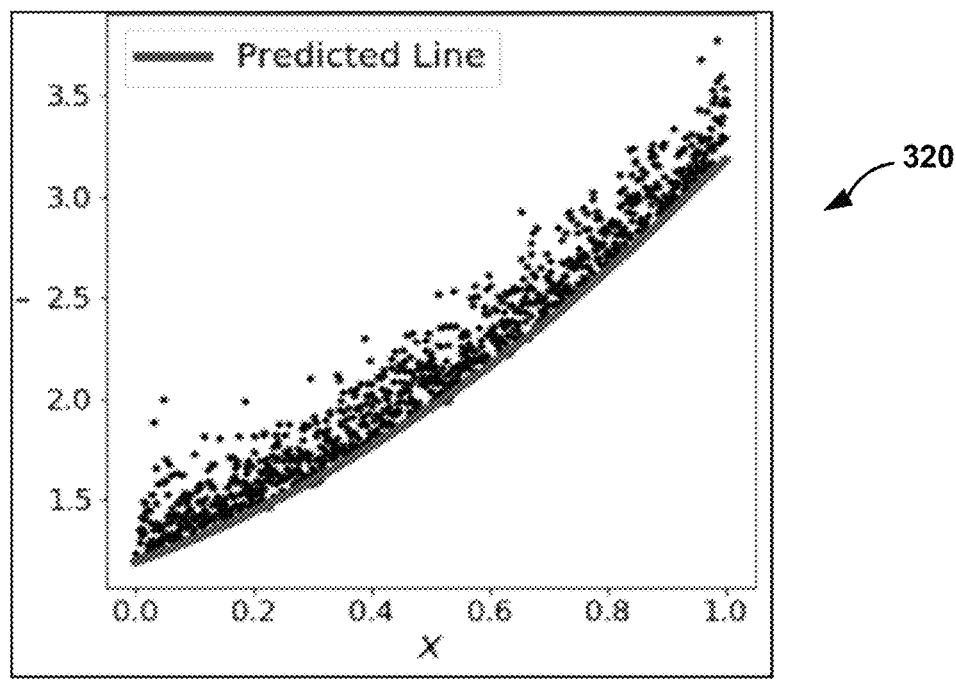
Figure 3C:
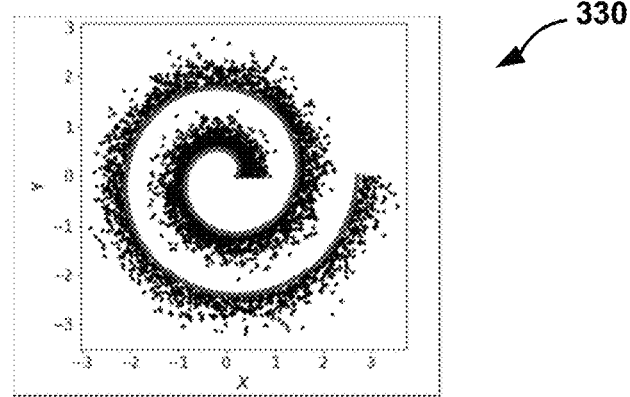

FIGS. 3A-3C illustrate three respective target distributions 310, 320, and 330 of measured delays for data communications between computing devices in a network in accordance with one or more techniques of the disclosure. Each target distribution 310, 320, or 330 represents the measured delays as a set of data points that form a bound for the measured delays in time stamp data.

In one example, target distribution 310 refers to a predicted line that is a linear bound of the measured delays. FIG. 3A illustrates a graph plotting data points including the linear bound to target in a linear regression model to be used for predicting a skewness estimate and an offset estimate. A slope of the linear bound may be the skewness estimate and an intercept of the non-linear bound may include an initial clock time difference and a trip time. Therefore, the offset estimate is computed from a linear function of the initial clock time difference, the skewness estimate, and an elapsed amount of time.

In one example, target distribution 320 refers to a predicted quadratic curve that is a non-linear bound of the measured delays. FIG. 3B illustrates a graph plotting data points including the non-linear bound to target in a linear regression model to be used for predicting a skewness estimate and an offset estimate. A derivative of an acceleration term for the non-linear bound may produce a linear function for computing a slope at a particular time interval. That slope may be the skewness estimate for that time interval and an intercept of the non-linear bound may include an initial clock time difference and a trip time. The offset estimate is computed from a linear function of the initial clock time difference, the derivative of the acceleration term, and an elapsed amount of time.

In one example, target distribution 330 refers to a circular or elliptical shape that is a complicated bound of the measured delays. FIG. 3C illustrates a graph plotting data points including the complicated bound to target for a linear regression model to be used for predicting a skewness estimate and an offset estimate. A radius of the complicated bound may grow linearly and a rate of that linear growth be the skewness estimate and a constant term of the complicated bound may include an initial clock time difference and a trip time. Therefore, the offset estimate is computed from a linear function of the initial clock time difference, the radius, and an elapsed amount of time.

Figure 4:
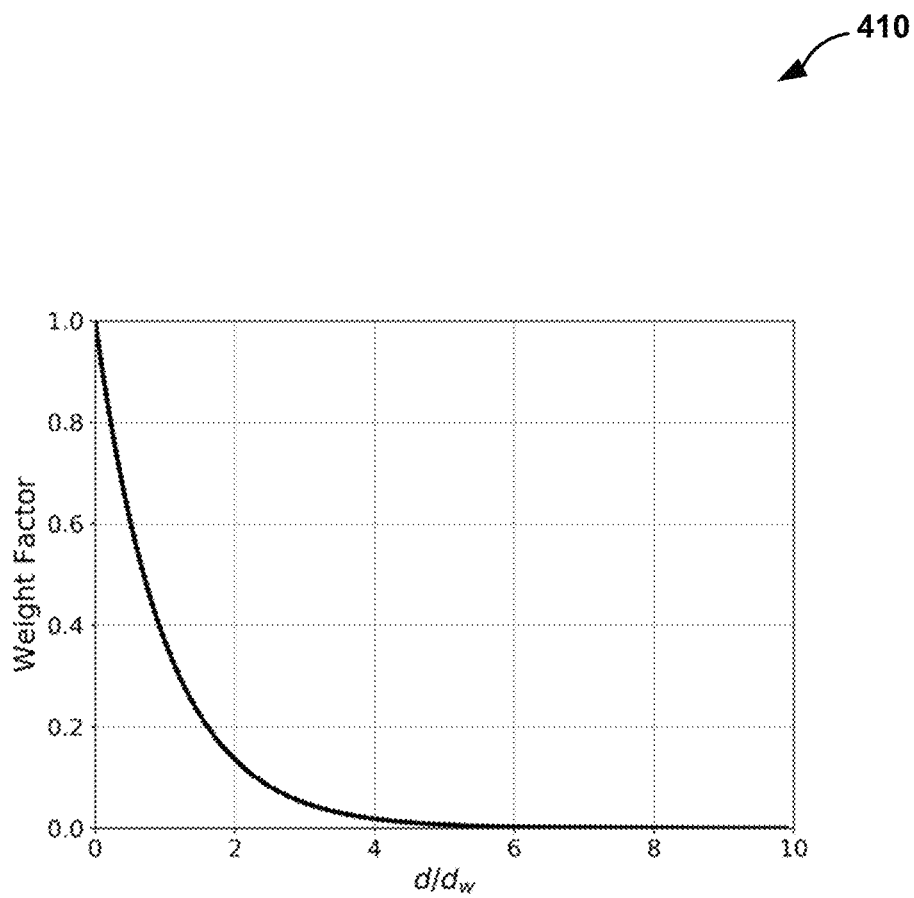
FIG. 4 is an example graph illustrating a distribution of weights for a weighted regression analysis in the network in accordance with one or more techniques of the disclosure.

FIG. 4 is an example graph illustrating a distribution 410 of weights for a weighted regression analysis in the network in accordance with one or more techniques of the disclosure. FIG. 4 illustrates the effect of normalized interaction distances for the weighted regression analysis. As described herein, the weighted regression analysis targets one or more bounds of data points provided by time stamp data.

The distribution 410 may be non-linear providing decreasingly smaller weights for data points having decreasingly smaller distances from the target bound. The interaction distance depends on the problem such that the value is relative to a range of the data points. For instance, if there is large error in amongst the data points and the number of data points along the bound is small, a slightly large interaction distance may be used to reduce the error due to the noise of the data set.

Figure 5A:
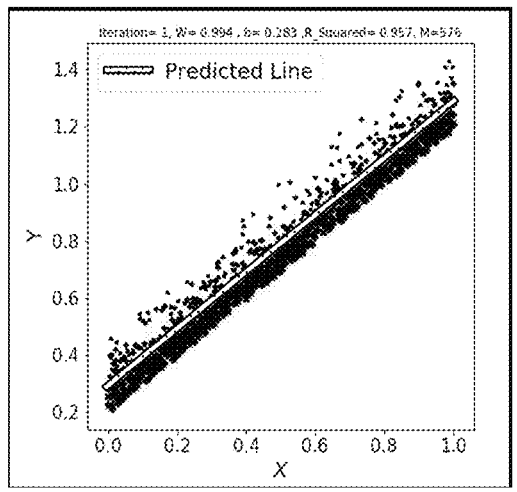
FIGS. 5A-5C are example graphs illustrating convergence of model parameters used in a weighted regression analysis in a network in accordance with one or more techniques of the disclosure.
Figure 5B:
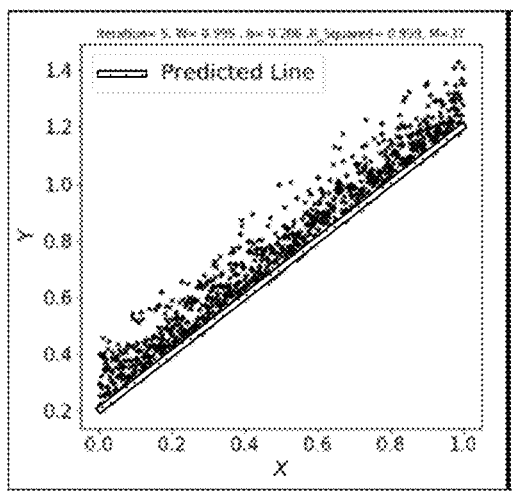
Figure 5C:
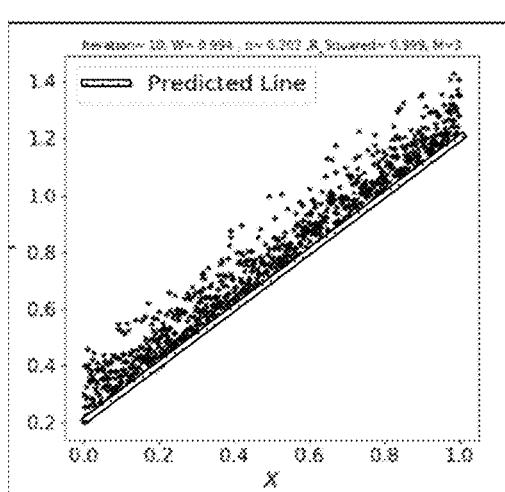

FIGS. 5A-5C are example graphs 510, 520, and 530 illustrating convergence of model parameters used in a weighted regression analysis in a network in accordance with one or more techniques of the disclosure. In some examples, FIGS. 5A-5C are example graphs 510, 520, and 530 plotting data points from same time stamp data where each data point is a measured delay for a one-way communication scheme. As described herein, the weighted regression analysis includes a linear regression machine learning model (i.e., "regression model") for predicting a skewness estimate and an offset estimate for the measured delays based upon a target bound representing a potential minimum path. The data points along the target bound should represent measured delays having a negligible amount of noise and network effect; therefore, the weighted regression analysis includes refining, over a number of iterations, the regression model parameters until a convergence test identifies an optimal or near-optimal target bound.

Graphs 510, 520, and 530 of FIGS. 5A-5C each highlight a different predicted line as the target bound for the regression model as the weighted regression analysis trains the regression model by updating the model parameters, updating the weights based upon the updated model parameters, and applying the convergence test over the number of iterations. The predicted lines in example graphs 510, 520, and 530 of FIGS. 5A-C represent a progression in the training of the regression model such that each predicted line represents one or more iterations. The model parameters include a slope and an intercept representing the skewness estimate and a combination of the offset estimate and a trip time.

The following description pertains to one iteration of the weighted regression analysis to calibrate model parameters into learning the minimum path bound. The predicted lines in example graphs 510, 520, and 530 of FIGS. 5A-5C are predicted to be the minimum path bound after one or more iterations In any of example graphs 510, 520, and 530 of FIGS. 5A-5C, data points near a true minimum path bound should have larger weights while other points should have zero or small weights. Each data point i is assigned a weight $w_i$. In some examples, the weight $w_i$ is known and in some examples, the weight $w_i$ is set to an initial value of one (1) and then, updated after at least one iteration.

One example objective function to be minimized can be written as $$J = \frac{1}{N} \sum_{i=1}^{N} w_i (\hat{y}_i - y_i)^2$$

where $\hat{y}_i$ is an estimated value on the predicted minimum path bound and N is the total number of data points.

For a linear regression model, the predicted minimum path bound may defined as the following:

$$\hat{Y} = XW^T + b.$$

Inserting the above equation into the objection function produces the following modified objective function:

$$J = \frac{1}{N} \sum_{i=1}^{N} w_i (x_i W^T + b - y_i)^2.$$

For the set of weights w, the model parameters W and b can be found using a gradient descent method where $\eta$ is the learning rate:

$$W_{t+1} = W_t - \eta \frac{\partial J}{\partial W},$$

$$b_{t+1} = b_t - \eta \frac{\partial J}{\partial b}.$$

The gradients for the gradient decent method can be determined according to:

$$\frac{\partial J}{\partial W} = \frac{2}{N} \sum_{i=1}^{N} w_i (x_i W^T + b - y_i)^2 x_i,$$

$$\frac{\partial J}{\partial b} = \frac{2}{N} \sum_{i=1}^{N} w_i (x_i W^T + b - y_i)^2.$$

While the above weighted regression analysis is straightforward if the weights are known, it remains a critical issue on how to properly set the weights. There are several purposes to apply weighted regression. A weighted regression is often used to keep the variance of the error constant where the weight is set to inversely proportional to the variance. In many situations, weighted regression is also used for unbalanced data or biased sample of the population. In accordance with the techniques of this disclosure, the purpose is to set proper weights to find the regression line along the bounds.

Instead of searching the data point on the bounds, multiple-iteration weighted regression method is proposed here to automatically find the regression line. The initial weights are equally set to ones. For given weights, the above weighted regression can be used to find the regression line. Then, the weights are modified using the following equation where $d_w$ is the interaction distance that measures how fast a weight decays when the data points are away from the predicted minimum path bound:

$$w_i = e^{-d_i/d_w}.$$

A distance of point i to the predicted line is $d_i$ and is defined as:

$$d_i = \begin{cases} \max(0, (\hat{y}_i - y_i)) & \text{for upper bound} \\ \max(0, \hat{y}_i - y_i) & \text{for lower bound} \end{cases}.$$

The interaction distance may be required in the weighted regression analysis where it may be referred to as a hyper-parameter in addition to the other regression model parameters of W and b. The interaction distance is a positive number. A small value means only data points near the regression line are effective. Since the weighted regression analysis is targeting the line along the bounds, a small value may be preferred. However, if there is large error in the time stamp data and the number of data points along the minimum path bound is small, a slightly large interaction distance may be used to reduce the error due to the noise of the dataset.

After updating the set of weights, the weighted regression analysis is either executed again to predict a more accurate minimum path bound or stopped after sufficient iterations. A convergence test is run to determine whether the predicted minimum path bound gradually converges to the true minimum path bound.

An example convergence test estimates the performance of the weighted regression analysis using a R-squared process according to:

$$R^2 = \frac{ESS}{TSS} = 1 - \frac{RSS}{TTS}.$$

In an example convergence test where $\bar{y}$ is a mean value, the terms ESS (Explained Sum of Squares), RSS (Residual Sum of Squares), and TSS (Total Sum of Squares) can be defined as with following:

$$ESS = \sum_{i=1}^{N} w_i(\hat{y}_i - \bar{y})^2,$$

$$RSS = \sum_{i=1}^{N} w_i(\hat{y}_i - \bar{y})^2,$$

and $$TSS = \sum_{i=1}^{N} w_i(y_i - \bar{y})^2$$

R-squared ($R^2$) values range between 0 and 1 such that a perfect line with all data points along the predicted minimum path bound has a R-squared value of 1.

Convergence testing under the weighted regression analysis may involve analyzing R-squared and M values; in some examples, M represents, at each iteration, the number of data points with weights close to 1. R-squared values increase with the number of iterations while M values decreases with that number. Convergence testing may conclude when R-squared value is 1 and the model parameters have converged into final values. In some examples, the weighted regression analysis may conclude the convergence testing when R-squared value is close to 1 and M value is larger than a threshold value where the threshold value represents a minimal level of accuracy. Setting the threshold value reduces the impact of measurement errors and uncertainty of the model parameters due to a smaller M.

Figure 6A:
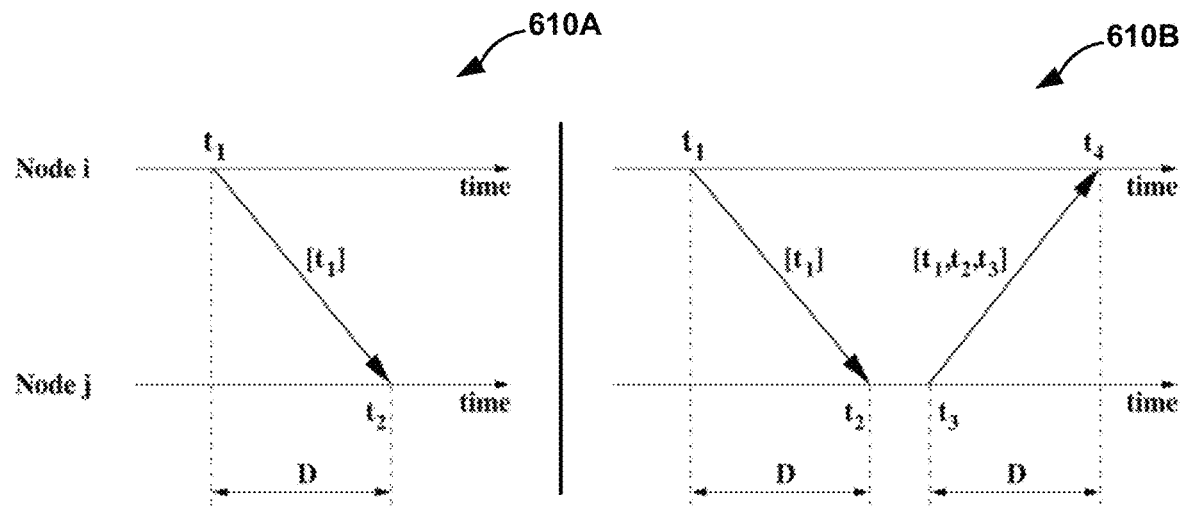
FIG. 6A illustrates signaling and trip times for one-way and two-way communications between two computing devices.
Figure 6B:
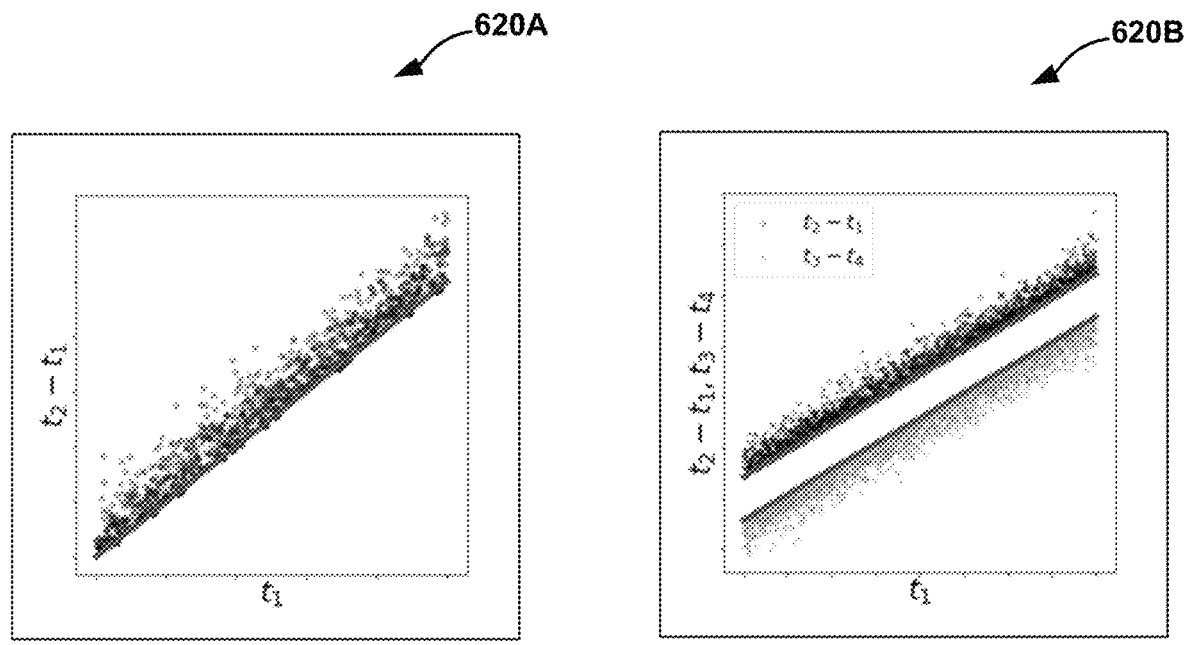
FIG. 6B illustrates two example graphs plotting measured delays for one-way and two-way communications between the same two computing devices in accordance with techniques of the disclosure.

FIG. 6A illustrates signaling and trip times for one-way communications and two-way communications between two computing devices and FIG. 6B illustrates two example graphs 620A, 620B plotting measured delays for one-way communications 610A and two-way communications 610B between the same two computing devices in accordance with techniques of the disclosure.

Signaling refers to time stamps between clocks at Node i (a first computing device) and Node j (a second computing device): $t_1$ is timestamp of the packet leaving the sender according to the sender (Node i); $t_2$ is timestamp of the packet arriving at the receiver according to the receiver (Node j); $t_3$ is timestamp of the packet leaving the sender according to the sender (Node j); and $t_4$ is timestamp of the packet arriving at the receiver according to the receiver (Node i). Hence, $t_1$ and $t_2$ are the corresponding transmit and receive time stamps in forward direction and $t_3$ and $t_4$ are for reverse direction. D is the trip time in each way which is assumed to be the same.

When a timing protocol executes a time synchronization operation, an offset between the two clocks at Node i and Node j is determined and used to correct one of the clocks. Due to the delay of the network, the measured delays between the nodes vary. Therefore, finding the offset at a minimum path bound means minimum network traffic effect on the measured delay. The techniques described herein implement a weighted regression analysis to identify the minimum path as a bound (e.g., a lower or upper linear/non-linear bound) on the measured delays. The one-way communications and two-way communications described in FIGS. 6A and 6B can be used in a one-way scheme 610A and a two-way scheme 610B for modeling one or multiple bounds in the time stamp data.

Consider, for instance, FIG. 6A which shows the one-way communication scheme 610A between two nodes. For the one-way scheme 610, one node sends a time stamped packet which records a local time ($t_1$) and another node records its local time at the receiver $t_2$ when it receives the packet such that D is the trip time. These time stamps have the following linear relationship:

$$t_2 - t_1 = D + \theta.$$

In the above relationship, $\theta$ is the clock time difference that can be described as:

$$\theta(t) = \alpha t + \beta$$

where $\alpha$ is a frequency difference (i.e., skewness estimate) between of the two nodes and $\beta$ is the initial clock time difference (i.e., the offset estimate at $t=0$). For a linear bound (e.g., the minimum path bound), the slope gives $\alpha$ and intercept gives $D+\beta$ such that:

$$t_2 - t_1 = \alpha t + D + \beta.$$

When D is known, the frequency difference and the initial clock difference may be learned using the linear regression model when there is no network induced delay. In examples where there is a network induced delay (e.g., high network traffic loads), the weighted regression analysis is performed to target a lower bound where D has a minimum. The above linear relationship is true only on minimum path. In some examples, a non-negative delay is added to D due to the network effect.

Example graph 620A of FIG. 6B shows one example of the minimum path bound when there is a network induced delay. By targeting the minimum path as the linear bound, the one-way communication scheme 610A builds and trains a linear regression model as:

$$t_2 - t_1 = \alpha t + \beta + D - e.$$

When D is unknown, the two-way scheme 610B of FIG. 6A is used to estimate the skewness estimate and the offset estimate. The Precision Time Protocol (PTP) is an example of the two-way scheme 610B. In the two-way scheme 610B (differently from the one-way scheme 610A), the two nodes communicate in the reverse direction and the forward direction such that each node sends and receives one packet. With the assumption of same trip time D in both directions, the time stamps have the following relationship:

$$t_2-t_1=D+\theta, \text{ and}$$

$$t_3-t_4=-D+\theta.$$

Example graph 620B illustrated in FIG. 6B illustrates two linear bounds for use in the two-way scheme 620B. Similar to the one-way scheme 610A, these two linear bounds can be targeted and modeled from time stamp data in two datasets $(t_2-t_1)$ and $(t_3-t_4)$ such that these linear bounds share a same slope a, which is the skewness estimate, and an average of the intercepts $b_1$ and $b_2$ provides the offset estimate at time t=0, as illustrated in the following equations:

$$t_2-t_1=\alpha t+b_1,$$

$$t_3-t_4=\alpha t+b_2,$$

and $$\beta = \frac{1}{2}[b_2 + b_1].$$

Combining the above relationship with the above equations results in $b_1$ and $b_2$ being equal to $\beta+D$ and $\beta-D$ and the two-way scheme 610B becomes the following:

$$t_2-t_1=\alpha t+\beta+D,$$

$$t_3-t_4=\alpha t+\beta-D,$$

and $$\beta = \frac{1}{2}[\beta - D + \beta + D].$$

Figure 7:
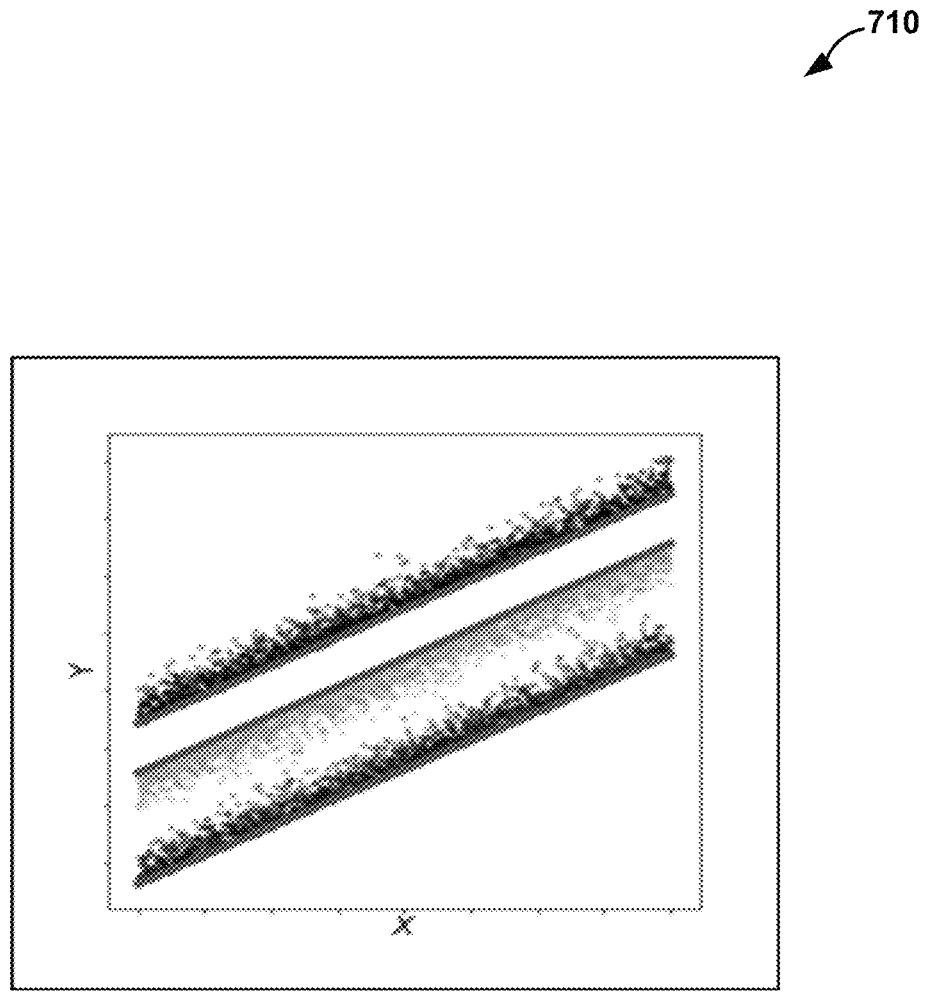
FIG. 7 illustrates an example graph depicting multiple linear bounds for a weighted regression analysis in accordance with techniques of the disclosure.

FIG. 7 illustrates an example graph 710 depicting multiple linear bounds for a weighted regression analysis in accordance with techniques of the disclosure.

The three bounds in FIG. 7 share a same slope. As described herein for two-way communications in a network, devices communicate packets forward and backward once or twice. For a synchronization operation, the three bounds share a same slope which is the frequency difference between the two device clocks.

Without loss of generality, it is assumed that there are K (K>1) bounds in total that share a slope. The weighted regression analysis determines the shared slope and the individual intercepts. Assuming a number of data points for each bound is $N_K$ with k=1, . . . , K, the shared slope is W and intercepts for each bound are $b_k$, the objective function to be minimized is according to:

$$J = \frac{1}{N_1 + N_2 + \ldots + N_K} \sum_{k=1}^{K} \sum_{i=1}^{N_k} w_{i,N_k} (x_{i,N_k} W^T + b_k - y_{i,N_k})^2.$$

The following equations provide gradients for the above objective function to be minimized:

$$\frac{\partial J}{\partial W} = \frac{2}{N_1 + N_2 + \ldots + N_K} \sum_{k=1}^{K} \sum_{i=1}^{N_k} w_{i,N_k} (x_{i,N_k} W^T + b_k - y_{i,N_k}) x_{i,N_k},$$

$$\frac{\partial J}{\partial b_k} = \frac{2}{N_k} \sum_{i=1}^{N_k} w_{i,N_k} (x_{i,N_k} W^T + b_k - y_{i,N_k}).$$

The above gradients can used in the gradient descent method. The weights can be updated using the interaction distance hyperparameter in the following equation:

$$w_i = e^{-d_i/d_w}.$$

The multiple linear bounds K may share the regression model parameters in other ways, for instance, sharing intercept parameters, partially sharing the coefficients in W, which is a vector that represents multiple regressions in general.

Figure 8:
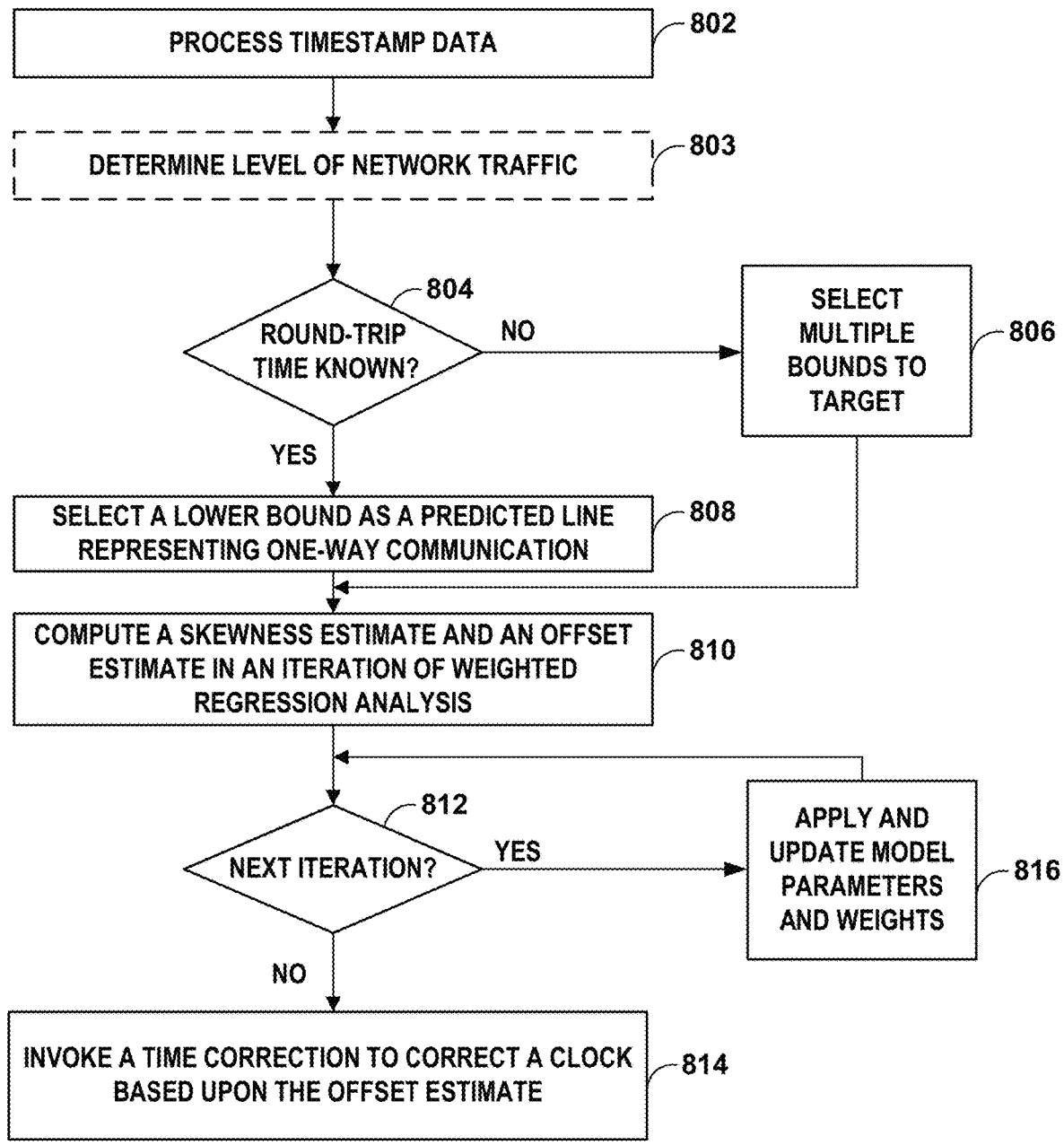
FIG. 8 is a flowchart illustrating an example time synchronization process for a plurality of computing devices in accordance with techniques of the disclosure.

FIG. 8 is a flowchart illustrating an example time synchronization process for a plurality of computing devices in accordance with techniques of the disclosure. For convenience, FIG. 8 is described with respect to FIGS. 1 and 2.

In the example of FIG. 8, processing circuitry 205 processes time stamp data (802) and, as an option, processes the time stamp data to determine a level of network traffic between computing devices (803). In general, network traffic refers to a measurement (e.g., a density) of protocol data units (e.g., network packets) being transmitted between devices over a time period. The time stamp data includes time stamps attributed to arrivals/departures of these protocol data units to/from computing devices in a network. From these time stamps, processing circuitry 205 determines (approximately) how many protocol data units are being transmitted through the network at a given moment as well as measured delays for these transmissions. The determination of whether network traffic is heavy may be established by comparing latencies to a threshold that is determined from lowest-latencies or configured by an operator. In another example, network traffic may be classified as heavy network traffic when fewer than a threshold number of network packets have a measured delay at or near a minimum time value amongst the measured delays for the transmissions. In a probability density function (PDF) describing network traffic in the network, each data point is a probability (p) that a network packet has a corresponding time value as a measured delay; if the probability for the minimum time value falls below a certain threshold (e.g., a threshold percentage), processing circuitry 205 determines that the network traffic is heavy. Hence, in this example processing circuitry determines a level of network traffic based upon a distribution of the PDF of measured delays in the network. In other examples, processing circuitry determines whether the network traffic is heavy based on traffic statistics collected by network device 200 based on sent and/or received packets.

Processing circuitry 205 determines whether a round trip time is known (804). If the round trip time is known (YES branch of 804), processing circuitry 205 proceeds to select a lower bound as a predicted line representing one-way communications along the minimum path (808). The round trip time may be known if a minimum path is well-defined (e.g., during time periods of low or normal network traffic). For example, when the level of network traffic is not heavy, the linear regression model is to target a linear bound that is the minimum path or lower bound. Taking advantage of well-defined minimum path, processing circuitry 205 computes a trip time (D) to be $(t_2-t_1)$ and the round trip time (d) as $2*(t_2-t_1)$ or $(t_2-t_1)+(t_4-t_3)$.

Even if the minimum path is not well-defined (e.g., during time periods of heavy network traffic), processing circuitry 205 determines the round trip time by determining a skewness estimate from a regression model and applying to the skewness estimate a prediction model for the round trip time. One example technique for determining the round trip time when the minimum path is not well-defined (e.g., during time periods of heavy network traffic) is provided by U.S. Provisional Application No. 62/975,627, filed Feb. 12, 2020, the entire contents of which are incorporated by reference herein. For example, when the level of network traffic is heavy, the linear regression model is to target a linear bound that is not the minimum path and instead, is a line defining an actual delay or round trip time (d). Hence, if the round trip time is known (YES branch of 804) and, as an option, the level of network traffic is heavy, processing circuitry 205 proceeds to select, as a predicted line, a linear bound representing actual measured delays in one-way communications between devices (808).

If the round trip time is unknown (NO branch of 804), processing circuitry 205 proceeds to select multiple bounds to target in a linear regression model for time synchronization/clock time correction (806). There are a number of instances when the round trip time is unknown, for example, during time periods of substantial noise and/or where the level of network traffic is heavy. The multiple bounds are multiple predicted lines representing two-way communications along a minimum delay path or minimum path.

Processing circuitry 205 computes a skewness estimate and an offset estimate in an iteration of a weighted regression analysis (810). As described herein, the skewness estimate is a frequency difference between clock 203 at computing device 200 and a second clock at a second computing device and the offset estimate is a clock time difference between clock 203 and the second clock. In some examples, processing circuitry 205 executes, over a number of iterations, a weighted regression analysis targeting the above-mentioned linear bound of the time stamp data. The weighted regression analysis includes a set of weights for training the regression model to predict the offset estimate and the skewness estimate. The regression model having parameters to apply to the at least one bound of the time stamp data. In some examples, processing circuitry 205 calibrates the skewness estimate and the offset estimate by, for each iteration of a number of iterations, updating the set of weights based upon an interaction distance measuring decay of the set of weights and updating the parameters of the regression model based upon an objective function and gradients of the parameters.

Processing circuitry 205 determines whether a next iteration is needed, for example, after running a convergence test (812). If the convergence test indicates that the next iteration is needed (YES branch of 812), processing circuitry 205 proceeds to apply regression model parameters and the set of weights the time stamp data and then, update the model parameters and weights to further converge the regression model to the time stamp data. If the convergence test indicates that the next iteration is not needed (NO branch of 812), processing circuitry 205 proceeds to invoke a time correction to correct a clock based upon the offset estimate (814). In some examples, processing circuitry 205 computes an amount of time to adjust the clock using the offset estimate and the skewness estimate or only the offset estimate. If the round trip time is known, only the offset estimate is used to determine the amount of time needed to adjust the clock in the time correction.

If computing device 200 operates as a master device in a master-slave relationship in a timing protocol, processing circuitry 205 identifies a number of slave computing devices that have a same time difference with clock 203 and distributes the computed amount of time to each identified computing device for that device to use in correcting its clock. If computing device 200 operates as the slave device communicating packets with the master computing device, processing circuitry 205 may compute the skewness estimate and the offset estimate from the time stamp data associated with these packets and then, use the skewness estimate and/or the offset estimate to determine the amount of time to correct clock 203. In yet another embodiment, computing device 200 operates as the slave device and processing circuitry 205 provides the master computing device with the skewness estimate and the offset estimate from the time stamp data. In turn, the master computing device determines an appropriate amount of time for a time correction to adjust clock 203. The master computing device may determine the appropriate amount of time by aggregating the skewness estimate and/or the offset estimate from each slave computing device including computing device 200.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD- ROM, a floppy disk, a cassette, magnetic media, optical media, or other computer readable media.

What is claimed is:

1. A method comprising:

obtaining, by processing circuitry of a first computing device in a network having a network topology of computing devices, time stamp data in accordance with a synchronization operation for a timing protocol, wherein the time stamp data describes one or more measured delays for a path between the first computing device and a second computing device of the network;

computing, by the processing circuitry, a skewness estimate and an offset estimate from the time stamp data by executing, over a number of iterations, a weighted regression analysis targeting at least one bound of the time stamp data, the skewness estimate comprising a frequency difference between a first clock at the first computing device and a second clock at the second computing device, the offset estimate comprising a clock time difference between the first clock and the second clock, the weighted regression analysis comprising a set of weights for training a regression model to predict the offset estimate and the skewness estimate, the regression model having parameters to apply to the at least one bound of the time stamp data, wherein the parameters of the regression model and the set of weights are updated after each iteration of the number of iterations; and applying a clock time correction to the at least one of the first clock or the second clock based the offset estimate.

2. The method of claim 1, wherein computing the skewness estimate and the offset estimate further comprises for each of the number of iterations, updating the set of weights based upon an interaction distance measuring decay of the set of weights.

3. The method of claim 2, wherein updating the set of weights further comprises modifying the set of weights using the interaction distance $d_i$ according to:

$$w_i = e^{-d_i/d_w}.$$

4. The method of claim 1, wherein computing the skewness estimate and the offset estimate further comprises for each of the number of iterations, updating the parameters of the regression model based upon an objective function and gradients of the parameters.

5. The method of claim 4, wherein computing the skewness estimate and the offset estimate further comprises minimizing the objective function.

6. The method of claim 4, wherein the objective function is computed as:

$$J = \frac{1}{N}\sum_{i=1}^{N} w_i(\hat{y}_i - y_i)^2$$

where N is a total number of data points, $w_i$ is a weight, $\hat{y}_i$ is a data point on a predicted line, and $y_i$ is a data point from the time stamp data.

7. The method of claim 6, wherein the predicted line is a lower bound of the time stamp data and estimated according to:

$$Y = XW^T + b,$$

where $W^T$ and b are parameters of the regression model.

8. The method of claim 7, wherein the objective function is combined with the regression model to produce an equation according to:

$$J = \frac{1}{N}\sum_{i=1}^{N} w_i(x_i W^T + b - y_i)^2.$$

9. The method of claim 7, wherein the parameters can be determined using a gradient descent method according to:

$$W_{t+1} = W_t - \eta\frac{\partial J}{\partial W},$$

$$b_{t+1} = b_t - \eta\frac{\partial J}{\partial b}.$$

10. The method of claim 9, wherein gradients for the gradient decent method can be determined according to:

$$\frac{\partial J}{\partial W} = \frac{2}{N}\sum_{i=1}^{N} w_i(x_i W^T + b - y_i)^2 x_i,$$

$$\frac{\partial J}{\partial b} = \frac{2}{N}\sum_{i=1}^{N} w_i(x_i W^T + b - y_i)^2.$$

11. The method of claim 1, wherein computing the skewness estimate and the offset estimate further comprises setting each of the set of weights to an initial value of one (1).

12. The method of claim 1, further comprising:

determining, by the processing circuitry, a level of network traffic between the first computing device and the other computing device of the network; and performing, by the processing circuitry, the computing of the skewness estimate and the offset estimate in response to determining that the level of network traffic exceeds a threshold.

13. The method of claim 1, wherein computing the skewness estimate and the offset estimate further comprises computing, for at least two bounds, a slope and at least two intercepts, wherein an average of the at least two intercepts comprises the offset estimate, and wherein the slope comprises the skewness estimate.

14. The method of claim 1, wherein computing the skewness estimate and the offset estimate further comprises running a convergence test to estimate a performance of the weighted regression analysis.

15. The method of claim 14, wherein running the convergence test further comprises using a R-squared process according to:

$$R^2 = \frac{ESS}{TSS} = 1 - \frac{RSS}{TSS}$$

where $$TSS = \sum_{i=1}^{N} w_i(y_i - y)^2.$$

and $$RSS = \sum_{i=1}^{N} w_i(y_i - \hat{y}_i)^2, ESS = \sum_{i=1}^{N} w_i(\hat{y}_i - \bar{y})^2,$$

16. The method of claim 1, wherein applying a clock time correction to the at least one of the first clock or the second clock based the offset estimate further comprises applying the clock time correction to the at least one of the first clock or the second clock based the offset estimate and the skewness estimate.

17. A computing device comprising:
 computer memory; and
 processing circuitry coupled to the computer memory and configured to provide time synchronization for a plurality of clocks on a network having a network topology of computing devices, the processing circuitry operative to:
  obtain time stamp data in accordance with a synchronization operation for a timing protocol, wherein the time stamp data describes one or more measured delays for a path between the first computing device and a second computing device of the network;
  compute a skewness estimate and an offset estimate from the time stamp data by executing, over a number of iterations, a weighted regression analysis targeting at least one bound of the time stamp data, the skewness estimate comprising a frequency difference between a first clock at the first computing device and a second clock at the second computing device, the offset estimate comprising a clock time difference between the first clock and the second clock, the weighted regression analysis comprising a set of weights for training a regression model to predict the offset estimate and the skewness estimate, the regression model having parameters to apply to the at least one bound of the time stamp data, wherein the parameters of the regression model and the set of weights are updated after each iteration of the number of iterations; and
  apply a clock time correction to the at least one of the first clock or the second clock based the offset estimate.

18. The computing device of claim 17, wherein to compute the skewness estimate and the offset estimate, the processing circuitry is further configured to: for each of the number of iterations, update the set of weights based upon an interaction distance measuring decay of the set of weights.

19. The computing device of claim 17, wherein to compute the skewness estimate and the offset estimate, the processing circuitry is further configured to: for each of the number of iterations, update the parameters of the regression model based upon an objective function and gradients of the parameters.

20. A non-transitory computer-readable medium comprising executable instructions, that when executed by processing circuitry, cause a computing device to:
 obtain time stamp data in accordance with a synchronization operation for a timing protocol, wherein the time stamp data describes one or more measured delays for a path between the first computing device and a second computing device of the network;
 compute a skewness estimate and an offset estimate from the time stamp data by executing, over a number of iterations, a weighted regression analysis targeting at least one bound of the time stamp data, the skewness estimate comprising a frequency difference between a first clock at the first computing device and a second clock at the second computing device, the offset estimate comprising a clock time difference between the first clock and the second clock, the weighted regression analysis comprising a set of weights for training a regression model to predict the offset estimate and the skewness estimate, the regression model having parameters to apply to the at least one bound of the time stamp data, wherein the parameters of the regression model and the set of weights are updated after each iteration of the number of iterations; and
 apply a clock time correction to the at least one of the first clock or the second clock based the offset estimate.

* * * * *

UNITED STATES PATENT AND TRADEMARK OFFICE
CERTIFICATE OF CORRECTION

PATENT NO. : 11,063,738 B1
APPLICATION NO. : 17/131361
DATED : July 13, 2021
INVENTOR(S) : Lanfa Wang It is certified that error appears in the above-identified patent and that said Letters Patent is hereby corrected as shown below:

In the Claims

Claim 15

At Column 25, Line 5, replace:

" $TSS = \sum_{i=1}^{N} w_i(y_i - y)^2.$ "

With:

-- $RSS = \sum_{i=1}^{N} w_i(y_i - \hat{y}_i)^2, ESS = \sum_{i=1}^{N} w_i(\hat{y}_i - \bar{y})^2,$ --;

At Column 25, Line 12, replace:

" $RSS = \sum_{i=1}^{N} w_i(y_i - \hat{y}_i)^2, ESS = \sum_{i=1}^{N} w_i(\hat{y}_i - \bar{y})^2.$ "

With:

-- $TSS = \sum_{i=1}^{N} w_i(y_i - y)^2.$ --.

Signed and Sealed this
Sixth Day of June, 2023

Katherine Kelly Vidal
*Director of the United States Patent and Trademark Office*